United States Patent [19]

Coyle, Sr.

[11] E Patent Number: Re. 33,526

[45] Reissued Date of Patent: Jan. 29, 1991

[54] POWER TONGS AND CONTROL SYSTEM

[75] Inventor: William E. Coyle, Sr., Houma, La.

[73] Assignee: Bilco Tools, Inc., Houma, La.

[21] Appl. No.: 376,211

[22] Filed: Jun. 14, 1989

Related U.S. Patent Documents

Reissue of:

[64] Patent No.: 4,579,024
Issued: Apr. 1, 1986
Appl. No.: 629,421
Filed: Jul. 10, 1984

U.S. Applications:

[63] Continuation of Ser. No. 41,061, Apr. 22, 1987, abandoned.

[51] Int. Cl.[5] ..... B25B 23/15

[52] U.S. Cl. ..... 81/470; 173/12

[58] Field of Search ..... 81/467, 469, 470; 173/12, 2

[56] References Cited

U.S. PATENT DOCUMENTS

| | | | |
|---|---|---|---|
| 1,864,844 | 6/1932 | Meunier . | |
| 2,978,936 | 4/1961 | Orner . | |
| 3,299,725 | 1/1967 | Gewirc et al. . | |
| 3,319,494 | 5/1967 | Ulbing . | |
| 3,586,115 | 6/1971 | Amtaberg . | |
| 3,610,343 | 10/1971 | Bratt . | |
| 3,719,236 | 3/1973 | Smith, Jr. et al. | 173/12 |
| 3,719,237 | 3/1973 | Flick | 173/12 |
| 3,722,331 | 3/1973 | Radulescu | 81/467 |
| 4,037,672 | 7/1977 | Hodge . | |
| 4,125,040 | 11/1978 | True | 81/469 |
| 4,266,444 | 5/1981 | Anderson et al. . | |
| 4,305,472 | 12/1981 | Brossette | 173/12 |
| 4,484,871 | 11/1984 | Adman et al. | 81/470 X |

*Primary Examiner*—D. S. Meislin

*Attorney, Agent, or Firm*—Hoffman, Wasson, Fallow & Gitler

[57] ABSTRACT

A control system for power tongs comprises two tongs torque limiters, one of which limits tongs torque to a very low (hand-tight) level; the other limits torque at full makeup to, for example, 2000 ft. lb. The hand-tight torque limiter is manually or automatically disabled after the hand-tight level is reached. The system enables the operator to verify that the threads are properly engaged before applying full torque to the connection. The tongs have a very high reduction ratio, so that torque rises very slowly and can be more accurately controlled.

6 Claims, 2 Drawing Sheets

POWER TONGS AND CONTROL SYSTEM

Matter enclosed in heavy brackets [ ] appears in the original patent but forms no part of this reissue specification; matter printed in italics indicates the additions made by reissue.

*This is a continuation of application Ser. No. 041,061 filed Apr. 22, 1987, now abandoned.*

This invention relates generally to torque-limiting control systems for power tongs used to make up well pipe connections.

BACKGROUND

Well pipe is made up by supporting a lower pipe section ("joint") in the well and then threading an upper joint onto it by means of a fluid-driven power tongs. The pipe assembly is lowered as new joints are added, down to depths of several miles. Threaded well joint connections, in order to seal properly and to have maximum tensile strength, must be accurately tighted ("made-up" in the trade) to a design torque ("make-up torque") specified by the pipe manufacture. The design torque must not be exceeded, since galling or breakage of the pipe threads may result. This is particularly true with pipe joint materials chosen for considerations other than strength, e.g. corrosion resistance and impermeability. Such materials are not only relatively soft—they can be quite expensive. In one recent case, 1000 joints (each thirty-three feet long) were removed from a well. Every joint had thread damage due to overtorquing and was considered scrap. This was pipe originally costing $2500 per joint. The importance of controlling the torque applied by the power tongs to the pipe can thus be appreciated, and in fact it is a requirement on many jobs that a running record of maximum torque at each joint be kept. (Various systems exist for making torque records during make-up, including applicant's system described in copending application Ser. Nos. 487,048, *now U.S. Pat. No. 4,552,041,* and 526,611, *now abandoned.*) Despite the existence of accurate torque recording systems, improper torquing continues to occur. The industry still seeks a system that will positively prevent thread damage from overtorquing.

A second consideration is that thread damage can result not only from overtorquing but also from pipe misalignment. When the hoist supporting the upper end of a joint undergoes large lateral excursion occasioned perhaps by high winds, misalignment sufficient to cause cross-threading can occur. Once the threads are crossed, not much torque is required to ruin the threads. If the crossed thread is not detected, a leaky connection can result even though the proper torque is applied, since in that instance torque may not be an adequate indicator of sealing force.

The crossed thread problem is aggravated by violent or jerky movement of the tongs when power is first applied. The tongs frequently do not work smoothly—and are hard to control—at very low speeds. Also, the snub line, initially slack, tends to snap tight when power is first applied. These conditions make it difficult to control and/or record torque at the instant tongs operation begins, so that thread damage can occur even if a low-level torque limiter is used.

Even if the threads are not crossed, misalignment of the pipes can cause binding of the threads sufficient to produce galling as the pipe is rotated.

I have found that the above problems can be overcome by substantially increasing the overall gear reduction ratio within the tongs, for example, by a factor of five. The tongs jaw speed is correspondingly reduced, avoiding the problems of irregular start-up. This speed reduction is advantageously combined with a two-stage torque limiter system for (a) preventing the application of substantial torque during the initial phase of makeup and (b) limiting the maximum torque that the tongs can produce at the final makeup stage.

This invention is particularly useful for assembling connections of the type shown in U.S. Pat. No. 3,359,013. This type of connection has one or more annular shoulders associated with each thread, for engaging a corresponding shoulder on the mating piece. The threads themselves, being of a non-interference type, do not provide sealing, which occurs entirely at the contacting shoulders. During assembly, the pipe can be rotated by hand until shoulder contact occurs; thereafter only minor rotation, perhaps one-eighth turn, is needed to fully make up the connection. During this stage the required torque rises rapidly from hand-tight to, for example, 2000 ft. lbs. Comparative charts of torque T vs. turns N for conventional and shouldered threads are shown in FIGS. 3a and 3b. Plainly, the more rapid torque increase rate of the shouldered connection calls for a torque controller having fast response.

SUMMARY OF THE INVENTION

According to this invention, a shouldered pipe connection is made up in two stages. During the initial stage, the joint is rotated at a speed of about 20 rpm at very low torque (up to about 50 ft.-lb.) until the sealing shoulders engage. Thereafter only minor additional rotation is needed to seal the connection. During the final tightening stage, the pipe is rotated much more slowly up to a maximum torque limit on the order [of] *to* 2000 ft. lb. Optimum rotation speeds and makeup torques may vary, depending upon type. Specifications are usually provided by the pipe manufacturer.

Torque is automatically controlled during both tightening stages. In the initial stage, thread damage in the event of cross-threading is prevented by maintaining a very low torque cutoff point. In the final tightening stage, galling and breaking of threads is prevented by slowly turning the pipe 4 and automatically disabling the pipe tongs when a predetermined torque level is reached.

A primary object of the invention is to prevent overtorquing of shouldered connections. Another object is to prevent thread damage in the event of cross threading.

A further object is to protect the tongs operator from rapid tongs reaction movement when the tongs are initially actuated.

Another object is to enable the operator to control both the maximum obtainable tongs torque and the tongs speed during the final stage of connection makeup.

DESCRIPTION OF THE PREFERRED EMBODIMENT

Figure 1:
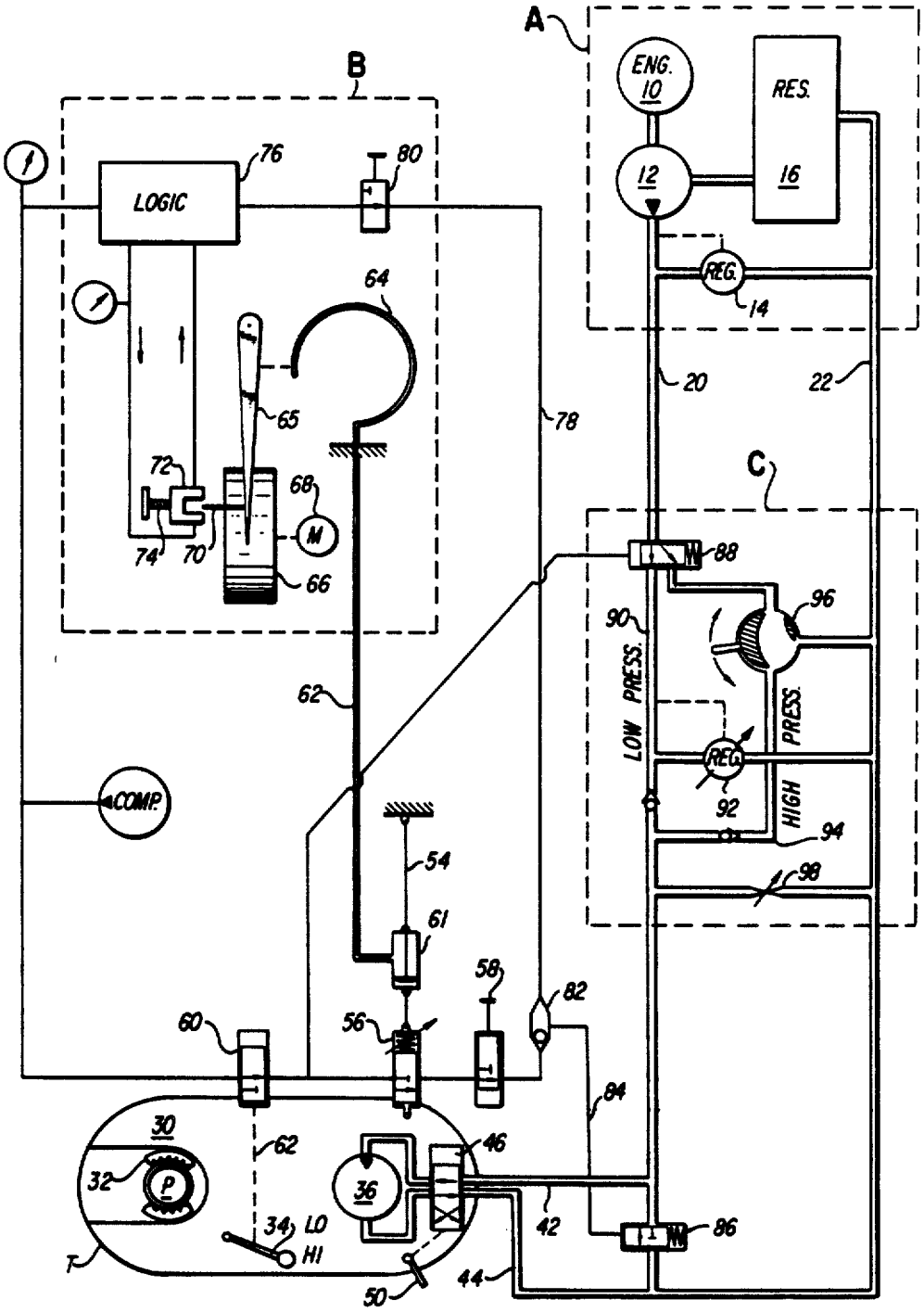
FIG. 1 is a schematic showing the invention diagrammatically.

The preferred embodiment of the invention is illustrated diagrammatically in FIG. 1. The major components are a conventional hydraulic power unit A, a power tongs T driven by fluid from the power unit, a tongs sensor/recorder B and a torque control module C.

The power unit A, as shown in FIG. 1, comprises an internal combustion engine 10, a hydraulic pump 12 driven thereby, a pressure regulator 14 downstream of the pump, and a fluid reservoir 16 upstream of the pump. In operation, the power unit delivers pressurized fluid through high pressure line 20, and receives fluid exhausted by the tongs via return line 22.

Figure 2:
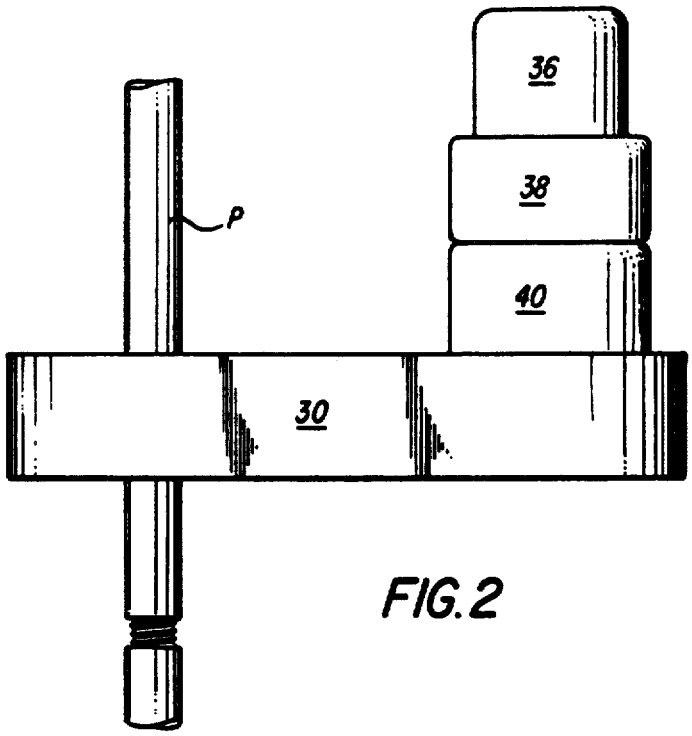
FIG. 2 is a side elevation of a tongs unit forming part of the invention.
Figure 3A:
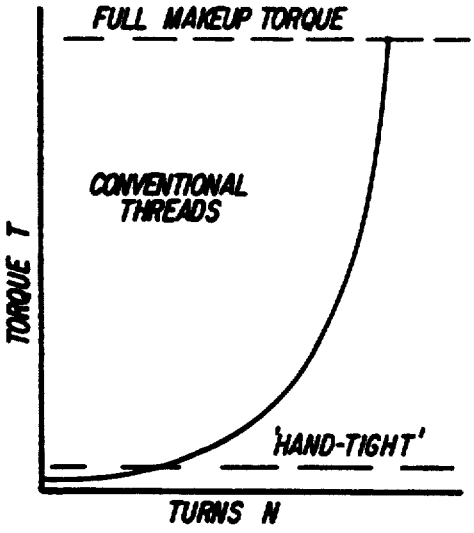
FIGS. 3a and 3b show comparative torque charts for conventional (FIG. 3a) and shouldered (FIG. 3b) connections.
Figure 3B:
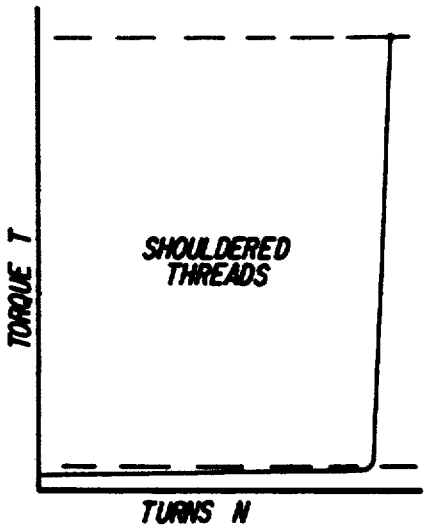

The tongs T have both conventional and novel aspects. A conventional body 30 supports rotary jaws 32 adapted to engage the outside diameter of a pipe P. The body houses a gear train, details of which are not shown, including a two- or multi-speed transmission. Tongs of this type are well known. The transmission is manually shifted by means of a gear selector 34, with the ratio between high and low speeds being on the order of 4:1. The tongs are powered by a hydraulic motor 36 driving through two planetary gear reduction units 38 and 40 (FIG. 2) in series, each having about 5⅛:1 reduction ratio. Further speed reduction is provided by spur gearing within the tongs body, so that the overall reduction is about 60:1 in high gear and 250:1 in low gear.

The tongs motor 36 is driven by fluid from the power unit, which enters the tongs via inlet line 42 and returns via exhaust line 44. A reversing shunt valve 46 on the tongs connected between the inlet and exhaust lines allows fluid to bypass the motor entirely when the valve is open. The shunt valve, normally open, may be moved to drive the tongs motor in either direction by a manual throttle handle 50 accessible to operator.

Any torque applied to the pipe P by the tongs creates a reaction torque that tends to rotate the tongs around the pipe. This tendency is restrained by a snub line 54 connected between a stationary object and the tongs body along a tangent line as shown. The snub line 54 includes two load transducers in series for monitoring tongs torque. The first transducer 56 is an on-off pneumatic valve having adjustable spring bias. This valve opens when tension corresponding to a preset "hand-tight" torque in the rage of 0–50 ft. lb. is applied. A manual override valve 58 in series with the first transducer 56 provides means by which the operator can disable the hand-tight torque control system, if desired.

An important feature of the invention is the on-off valve 60 mechanically connected via linkage 62 to the gear selector lever 34, such that the valve 60 is open only when the tongs are in their high-speed range, as shown. As a result, the transducer 56 performs its torque limiting function only during the initial, high speed phase [of] *to* tongs operation, and does not interfere with high torque operation during the final stage of makeup.

The snub line 54 also has mounted therein a second load transducer 61 which communicates via conduit 62 with a Bourdon tube 64 supported within the recorder module B. The free end of the Bourdon tube is connected to the stylus 65 of a conventional chart recorder 66 having a spring-driven motor 68. The stylus has a small blade 70 attached thereto capable of interrupting flow of air through a normally open air gap unit 72, which can be moved toward or away from the stylus by means of threaded support 74 to adjust the threshold makeup torque. The air gap unit is supplied with air regulated to a very low pressure, e.g. 5 psi, so as not to affect stylus position. The output signal is amplified and inverted by the pneumatic logic unit 76, details of which are shown in applicant's copending application Ser. No. 526,611, the disclosure of which is incorporated by reference. The logic unit 76 thus generates a high pressure output in conduit 78—provided the second override valve 80 is open—when the stylus blade 70 enters the air gap as the tongs reach maximum makeup torque. Conduit 78 leads to one input of a two-way check valve 82, the other input of which is from the hand-tight transducer 56. A high pressure at either input is thus delivered via conduit 84 to a second pneumatically actuated shunt valve 86, which when actuated halts tongs operation.

The valve 60, first transducer 56 and shunt valve 86 together provide means for halting tongs operation at a preset hand-tight torque level. Lever 34, linkage 62 and valve 60 function as means for disabling this first means. This general terminology is used in the claims below. The second transducer 61, recording module B and shunt valve 86 comprise means for halting tongs operation at a preset [fuel] *full* makeup torque level.

Turning to the torque control module C, it can be seen that the tongs exhaust line 44 is directly connected to return line 22, while the tongs inlet line 42 is variably regulated as to both pressure and flow rate. Fluid entering the module from supply line 20 first encounters a three-way pneumatically actuated valve 88, whose position is ultimately determined by the position of gear selector lever 34. In high gear, fluid is directed to line 90, which is regulated to very low pressure in the range of 25–200 psi by the adjustable pressure regulator 92, which relieves excess pressure back to the return line 22.

When the tongs are in low gear, and valve 60 blocks delivery of control pressure to valve 88, the supply line 20 is connected to a unregulated high pressure line 94 having therein a manually adjustable flow rate controller 96. This valve enables the operator to control maximum tongs speed during the final makeup stage, without affecting the maximum torque obtainable. The variable restriction 98 shunting supply and return lines 20 and 22, on the other hand, enables the operator to limit the pressure deliverable to the tongs. Maximum tongs torque can thus be limited, providing a measure of redundancy over the automatic control system defined between transducer 61 and shunt valve 86.

In operation, as a drill string is supported by slips or the like on a rig deck, a new joint is brought into mating contact with the next lower joint, Once the threads are engaged, the tongs operator, having placed the gear selector in high, throws throttle 50, thereby closing shunt valve 46 to apply regulated pressure from line 42 to the tongs motor, which rotates the pipe slowly at about twenty rpm hand tight. Note that compressed air passes through valve 60 to valve 88, which directs all hydraulic fluid flow past low pressure regulator 92, substantially limiting the torque capacity of the tongs. Furthermore, air pressure is supplied to first transducer 56. When the preset threshold snub line load is reached, air passes through transducer 56, override valve 58 and check valve 82 to open the second shunt valve 86 and automatically stop the tongs. In the event of improper thread engagement, this sequence of events disables the tongs before thread damage occurs, regardless of the operator's attentiveness or reaction time, and corrective action can be taken. It is not necessary, with this system, to count turns of pipe rotation or the like.

Provided the connection is properly run up to hand tight, and the operator can see that the sealing shoulders have come into contact, he then places the gear selector lever in "low", automatically obstructing the high pressure control signal to the second shunt valve 86, which thereupon closes so that tongs operation can be resumed. Simultaneously, the valve 88 reverses position [,] so that fluid at full pressure is delivered to the tongs. Now developing high torque, the tongs rotate the pipe very slowly—at five rpm or less, and this speed can be regulated by means of valve 96—until the desired makeup torque is reached. At the present cutoff torque level, stylus blade 70 enters the air gap unit, causing logic unit 76 to deliver a high pressure signal to open the second shunt valve 86, thereby automatically halting tongs operation.

The embodiment of the invention described above has proven extremely reliable in testing. The absence of sophisticated electronic monitors, alarms, and the like is attractive from a cost and repairability standpoint, and in fact the torque record charts have demonstrated unequaled consistency from connection to connection.

The foregoing is a description of but one embodiment of the invention, whose full scope is described by the following claims. Various modifications within the scope of the invention may occur to those of skill in the art. For example, electronic components could be substituted for the pneumatic components described. A fully pneumatic system is presently preferred, however, because many rig operators understandably prefer to keep electrical devices of all types away from the rig deck.

I claim:

1. A control system for a power tongs comprising a snub line for restraining the tongs, a first snub line tension transducer for generating signals proportional to tongs torque in the hand-tight range, a second snub line tension transducer for generating signals proportional to tongs torque in the full makeup torque range, first means responsive to said first transducer for halting tongs operation at a preset hand-tight torque level, second means responsive to said second transducer for halting tongs operation at a preset full makeup torque level, and means for disabling said first means.

2. The system described in claim 1 wherein said tongs have high and low speeds and a gear selector for choosing between said speeds, and said disabling means is controlled by said gear selector.

3. The system described in claim 2 wherein said disabling means is actuated to disable said first means only when the tongs are operated in the lower of said two speeds.

4. The system described in claim 3 wherein the ratio between said high and low speeds is at least 4:1.

5. The system described in claim 4 wherein the overall gear ratio between the tongs motor and the tongs jaws is about 250:1 in low speed and about 60:1 in high speed.

*6. A control system for a power tongs comprising*

*means for restraining the tongs from rotation,*

*a first transducer operatively connected to said restraining means for generating signals proportional to tongs torque in the hand-tight range,*

*a second transducer operatively connected to said restraining means for generating signals proportional to tongs torque in the full makeup torque range,*

*first means responsive to said first transducer for halting tongs operation at a preset hand-tight torque level,*

*second means responsive to said second transducer for halting tongs operation at a preset full makeup torque level, and*

*means for disabling said first means.*

* * * * *